Aug. 19, 1924.
N. P. LEVIN
1,505,570
DIFFERENTIAL GEARING
Filed Nov. 6, 1920
2 Sheets-Sheet 1
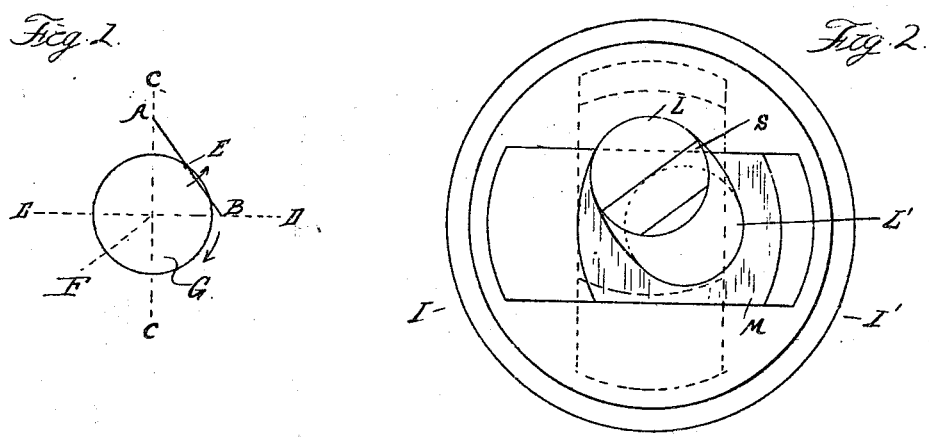
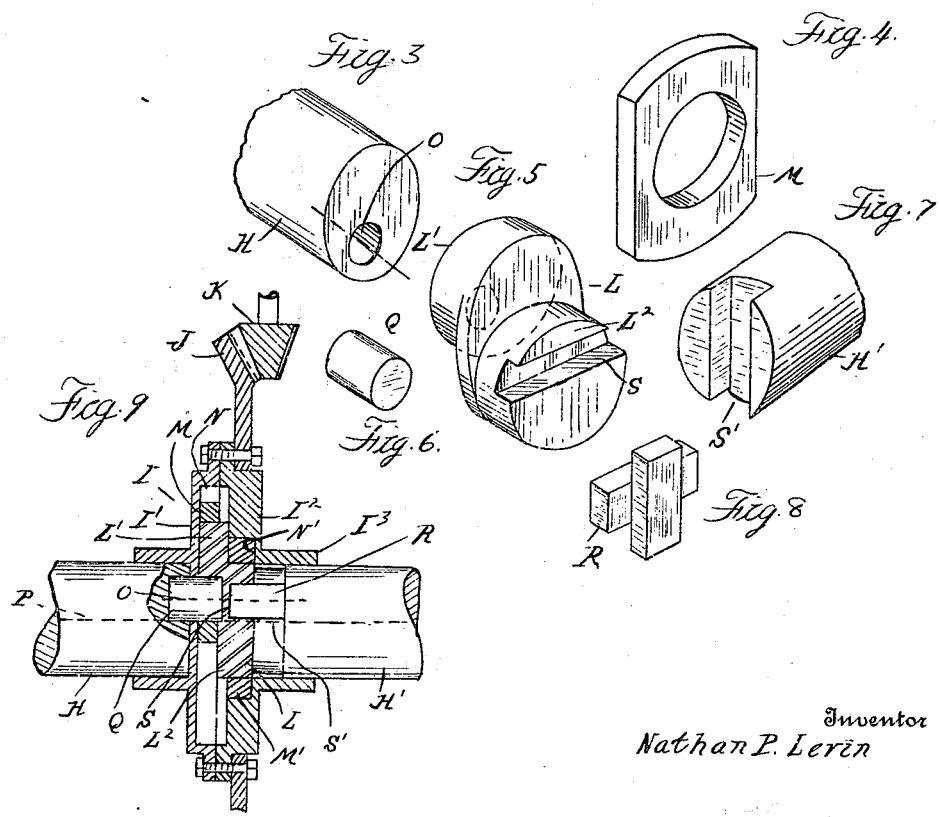
Inventor
Nathan P. Levin
By Whittemore Hulbert & Whittemore
Attorneys

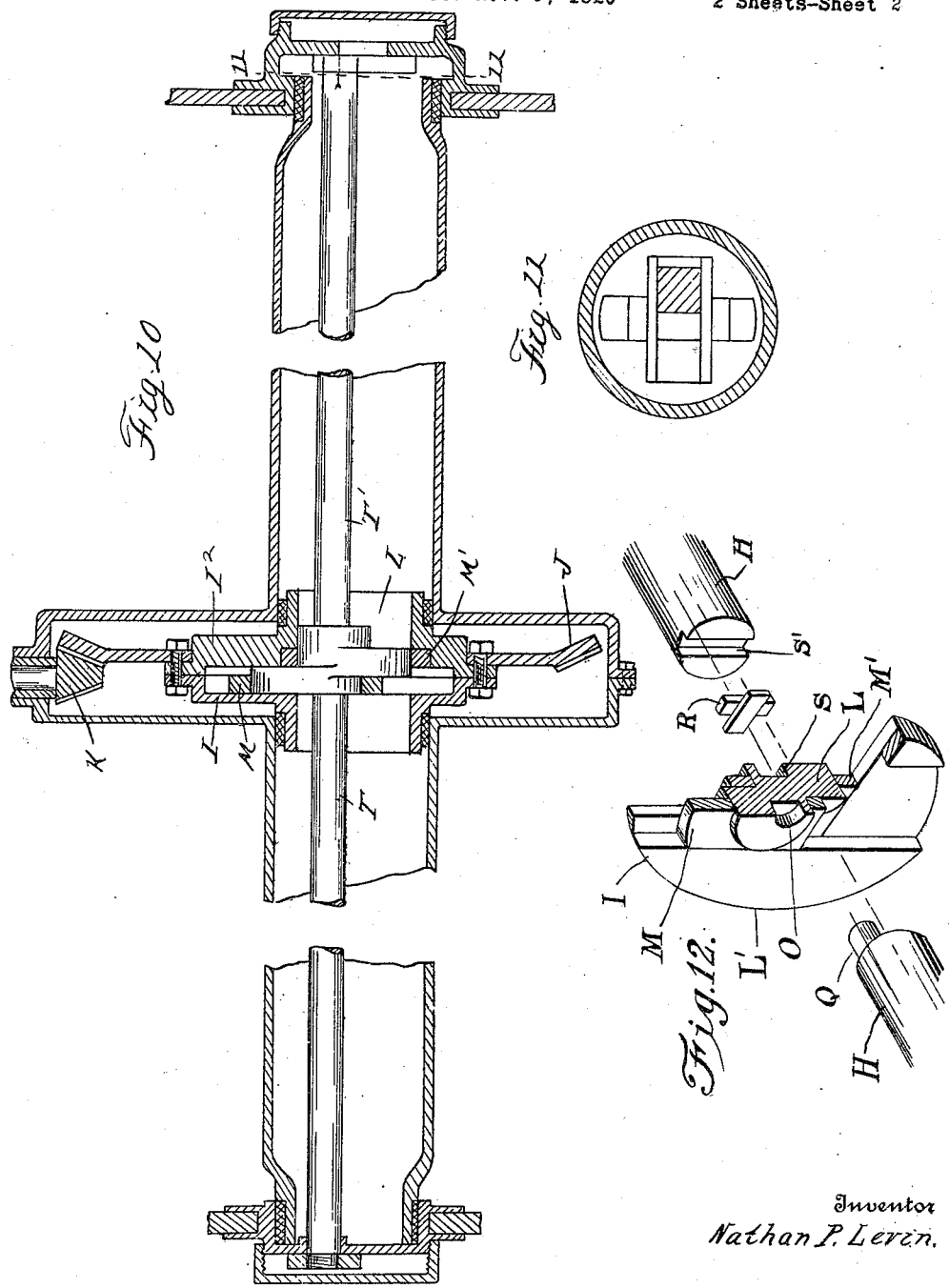

Patented Aug. 19, 1924.

1,505,570

UNITED STATES PATENT OFFICE.

NATHAN P. LEVIN, OF DETROIT, MICHIGAN.

DIFFERENTIAL GEARING.

Application filed November 6, 1920. Serial No. 422,191.

*To all whom it may concern:*

Be it known that I, NATHAN P. LEVIN, a citizen of the United States of America, residing at Detroit, in the county of Wayne and State of Michigan, have invented certain new and useful Improvements in Differential Gearing, of which the following is a specification, reference being had therein to the accompanying drawings.

The invention relates to differential gearings such as are employed on vehicle drive axles, jack shafts, etc., and has for its object the obtaining of a gearless construction which will function to positively drive a pair of shafts both forward and reverse, permitting of differentiation. To this end the invention consists in the construction as hereinafter set forth.

In the drawings:

Figure 1 is a diagram illustrating the geometrical principle of operation;

Figure 2 is an elevation of the differential gearing with one-half of the construction removed;

Figures 3, 4, 5, 6, 7 and 8 are perspective views of the various elements of the construction;

Figure 9 is a section partly in elevation in the plane of the axis of the driven shafts;

Figure 10 is a sectional elevation of an axle showing a modified construction of differential gearing;

Figure 11 is a section on line 11—11 of Figure 10.

My improvement is based upon a geometrical principle which is illustrated in Figure 1 and may be explained as follows:

If any element, illustrated by the line A—B, is so constrained that one point, such as the point A, therein is compelled to traverse the straight line C—C, and another point such as B is compelled to traverse a line D—D perpendicular to and crossing the line C—C, the following actions will result: The points A and B will reciprocate respectively along the lines C—C and D—D as above stated. The point E in the line A—B, which is midway between the points A and B, will traverse a circular orbit, while all other points in the line A—B will traverse elliptical orbits. All points in the lie A—B will during its movement rotate in a direction counter to the direction of their movement through their respective orbits.

From the above it is evident that if the line A—B represents a body or mechanical element which is constrained to move as described, the point E therein will traverse a circular orbit around the point F, which is the intersection of the lines C—C and D—D, moving in one direction as, for instance, clockwise, while the body or element will also rotate about the point E in the opposite direction, such as counter-clockwise, completing two revolutions with the completion of the cycle of its orbital movement. If the lines C—C and D—D represent guide-ways in a mechanical element G revoluble about the point F, it is evident that the element A—B must either revolve with the last-mentioned member as a unit or have a relative movement thereto. In the latter case there will be the two rotations in opposite directions, one concentric to the point F and the other eccentric thereto. Thus if the member G represents the driving element of a differential gearing and if the driven elements are coupled to the member A—B so as to respectively derive therefrom the orbital and rotational movements, the organization will function as a differential gearing.

Various specific constructions can be devised embodying the general principles above stated, but as shown in Figures 2 and 9, H and H' are aligned driven shafts of a differential gearing, and I is the driving member sleeved upon and concentric with said shafts. This driven member is shown as comprising a ring gear J which is driven from a bevel pinion K in the usual manner; also, a center portion formed of the members I' and I² arranged upon opposite sides of the central plane of rotation and each provided with a hub portion I³ sleeved about the driven shaft. The members I' and I² are formed with a central recess in which is located a member L having two eccentric cylindrical portions L' and L². These eccentric portions respectively engage bearing members M and M' shown as of rectangular form and which slidably engage guide-ways N and N' in the members I' and I² extending perpendicular to each other. The member L therefore constitutes in effect the element represented by A—B in the diagram of Figure 1. The eccentric portions L' and L² correspond to the points A and B and the guide-ways N and N' correspond to the perpendicular lines C—C and D—D.

The member L has an axis O which is midway between the axis of the eccentric portions L' and L² and this axis is also eccentric to the axis P of the shafts H and H' and driving member I. Q is a crank pin arranged concentric with the axis O and engaging bearing recesses in the member L and the shaft H. This will cause the member L, when moved by the driving member I about the axis P, to communicate a like rotary motion to the shaft H. R is a coupling member on the opposite side of the member L for transmitting its rotational movement about the axis O when moving relatively to the member I. For this coupling I preferably employ the construction commonly known as the Oldham coupling comprising guide-ways S and S' respectively in the members L and H' extending perpendicular to each other, while the member R engages these guide-ways so as to be rotatively fixed to each member while at the same time free to travel transversely. The effect is that rotary motion of the member L will be communicated to the member H' regardless of the fact that the rotations of the two members are about eccentric axes.

With the construction as described, it is evident that when the member I is rotated through the medium of the ring gear J and pinion K, it will normally communicate a similar rotation to each of the shafts H and H'. This is due to the fact that the member L will be carried with the member I and the couplings Q and R will act as crank pins for communicating the rotary movement of the member L to the respective shafts H and H'. If, however, the load or the resistance to rotation of the shafts H and H' is unequal they will be driven differentially, the action being as follows:

Assuming first that one of the shafts such as H' is held from rotation, this through the medium of the coupling R will hold the member L from rotation. Nevertheless, the member I is still free to rotate, but in doing so it will cause the member L to travel relative thereto along the transverse guides N and N'. This will cause an orbital movement of the coupling Q about the axis P and relative to the revolving member I, the effect of which is to drive the coupling Q at twice the angular speed that the member I is rotating at. The coupling Q communicates this accelerated movement to the shaft H, so that the latter will revolve at twice the speed of the member I and the ring gear J, while the shaft H' is held from any rotation. If, instead of holding the shaft H' from rotation it is permitted to rotate at an angular speed less than that of the member I, the shaft H will be accelerated to a corresponding degree.

In the construction shown in Figure 10 instead of using the couplings Q and R between the member L in the shafts H and H', shafts T and T' are used to extend from the member L to the wheels at opposite ends of the axle. These shafts T and T' will be eccentric to the axes of the wheels and will communicate to the wheels a differential rotation dependent upon the relative loads thereon. In other words, this modified construction functions the same as the construction first described, but instead of employing driven shafts which are in alignment with each other, the eccentric shafts T and T' are used.

With each of the constructions described the differential action is secured without the use of gears, while the structural elements are comparatively simple and can be easily manufactured and assembled.

What I claim as my invention is:

1. The combination with a rotary driving member and a pair of rotary driven members, of a differential transmission therebetween comprising a floating member carried by said driving member, means for constraining two spaced points in said floating member to the traversing of axially intersecting perpendicular lines in said driving member, whereby during differentiation said floating member will be rotated about a point midway between said spaced points, and said midway point will be given an orbital movement about the axis of the driving member, and coupling connections between said floating member and the respective driven members, for communicating respectively said rotary and orbital movements.

2. The combination with a rotary driving member provided with transverse guides perpendicular to each other and passing through the axis of rotation, and a pair of rotary driven members, of a differential transmission therebetween comprising a floating member carried by said driving member having means at two spaced points therein free when differentiating to respectively traverse said transverse guides in the driving member, whereby during differentiation said floating member will be rotated about a point midway between said spaced points, and said midway point will be given an orbital movement about the axis of the driving member, a coupling concentric to said midway point and connecting said floating member to one of said driven members for communicating to the latter the orbital movement of said midway point, and a second coupling between said floating member and the other of said driven members for communicating thereto the rotational movement of said floating member about said midway point.

3. The combination with a pair of rotary driven members, of a rotary driving member provided with crossing guides perpendicular to each other and passing through the axis of said driving member, a floating member having two spaced pivotal bearings respectively slidably engaging said perpendicular guides, whereby during differentiation said floating member will be rotated about a point midway between said spaced bearings, and said midway point will be given an orbital movement about the axis of the driving member, a coupling connection between said floating member and one of said driven members for communicating to the latter the rotational movement of said floating member about said midway point, and a second coupling connection between said floating member and the other of said driven members for imparting to the latter the orbital movement of said midway point.

4. The combination with a pair of rotary driven members, of a rotary driving member including complementary members adjoining each other in the plane of rotation, one of said members having grooved guides therein passing through the axis of rotation and perpendicular to each other, a floating member between said complementary members having two spaced pivotal bearings engaging respectively said grooved guides, whereby during differentiation said floating member will be rotated about a point midway between said spaced bearings, and said midway point will be given an orbital movement about the axis of the driving member, a crank pin concentric with said midway point forming a coupling for transmitting to one of said driven members the orbital movement of said midway point in said floating member, and a coupling between the opposite side of said floating member and the other of said driven members for transmitting the rotational movement of said floating member about said midway point.

5. The combination of a rotary driving member comprising complementary sections meeting in the plane of rotation, each of said sections being provided with a grooved guide extending through the axis of rotation and perpendicular to each other, a floating member enclosed between said complementary members having a pair of spaced pivotal bearings respectively slidably engaging said grooved guides, whereby during differentiation said floating member will be rotated about a point midway between said spaced bearings, and said midway point will be given an orbital movement about the axis of the driving member, a pair of shafts extending oppositely from said floating member having a common axis passing through said midway point, an axle housing enclosing said shafts and permitting eccentric rotation thereof, and a pair of wheels journaled upon said axle at opposite ends thereof, one of said shafts forming a crank engagement with one of said wheels to impart rotational movement about an eccentric axis and the other shaft having a connection to the other wheel for transmitting its rotary movement thereto.

6. The combination of a rotary driving member comprising a pair of complementary sections adjoining in the plane of rotation, each section having a grooved guide therein extending through the axis, and said guides being perpendicular to each other, said rotary driving member also having a tubular hub portion concentric with the axis of rotation, a floating member arranged between the sections of said driving member and having two spaced pivotal bearings for respectively slidably engaging said perpendicular guides, whereby during differentiation said floating member will be rotated about a point midway between said spaced bearings, and said midway point will be given an orbital movement about the axis of the driving member, a pair of driven members on opposite sides of said rotary driving member in co-axial alignment therewith, and a pair of couplings between said floating member and the respective driven members passing through said tubular hub, said couplings being concentric with said midway point in said floating member, one of said couplings transmitting to its driven member during differentiation the orbital movement of the midway point of said floating member, and the other of said couplings transmitting during differentiation the rotational movement of said floating member about said midway point, and both of said couplings transmitting when not differentiating rotational movement about the axis of said driving member.

In testimony whereof I affix my signature.

NATHAN P. LEVIN.